March 4, 1941. F. A. PARSONS 2,233,871
MIXING VALVE DEVICE
Original Filed Sept. 22, 1934
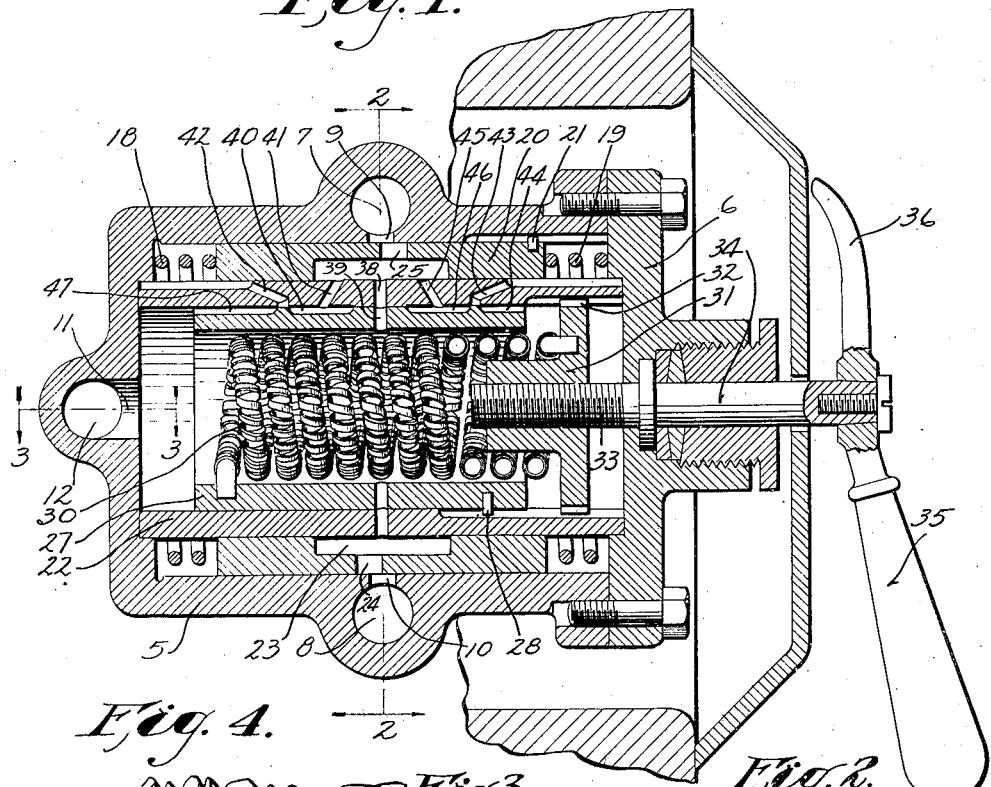
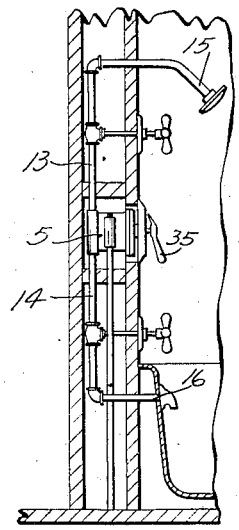
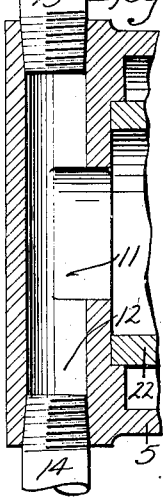
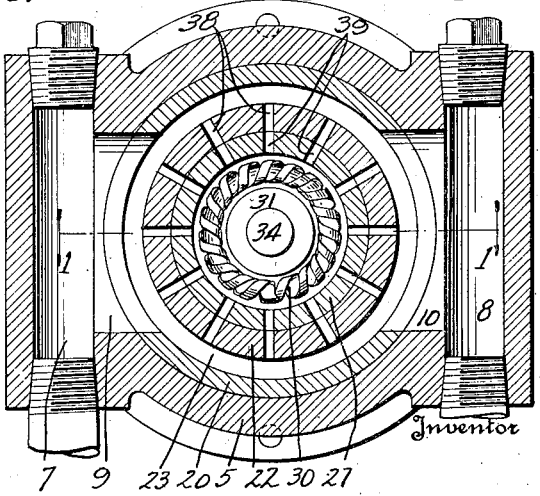
Inventor
Fred A. Parsons
By Wheler, Wheler and Wheler
Attorneys Patented Mar. 4, 1941

2,233,871

UNITED STATES PATENT OFFICE 2,233,871

MIXING VALVE DEVICE

Fred A. Parsons, Milwaukee, Wis.

Application September 22, 1934, Serial No. 745,071
Renewed October 30, 1939

5 Claims. (Cl. 236—12)

This invention relates to devices for maintaining a desired temperature of fluid mixture from a plurality of relatively different temperature supply sources, and more particularly for controlling the temperature of a water supply for appliances such as bath tubs, lavatories, shower heads, etc. A purpose is to provide an improved device selectively adjustable for a desired temperature and operable by power for maintaining such temperature in spite of variations in the temperature or pressure of fluid in either or both of a plurality of sources from which the device is supplied.

A further purpose is to provide such a power operated device in which the power required for its operation is derived from fluid pressure and more particularly from the pressure of fluid passing through the device or devices from one or the other or both of the supply sources from which the fluid mixture is drawn.

A further purpose is to generally simplify and improve the construction and operation of devices for each or any of the above mentioned purposes or for combinations thereof and particularly as relates to devices as above mentioned adapted for being housed within a partition wall of normal thickness while still permitting of convenient access to the working or operating parts of the device, and still other purposes will be apparent from the accompanying specification. The invention consists in the arrangement and combination of parts as herein illustrated, described and claimed, and in such modifications of the structure illustrated as may be equivalent to the claims.

The present application is a companion to Patent No. 1,989,335, granted January 29, 1935, and to Patent No. 2,121,259, granted June 21, 1938.

In the accompanying drawing the same reference characters have been used to designate the same parts in each of the views of which:

Figure 1 is a horizontal section through a mixing valve incorporating the invention and taken along line 1—1 of Fig. 2.

Figure 2 is a transverse vertical section through the same valve and taken along line 2—2 of Fig. 1.

Figure 3 is a fragmentary vertical axial section taken on the line 3—3 of Fig. 1.

Figure 4 is a view on a reduced scale showing in elevation the installation of the present device and its connections.

The valve comprises a casing 5 of generally cylindrical form having a removable closure plate 6. The supply ducts 7 and 8 for hot and cold water respectively provided with peripherally elongated ports 9 and 10 communicating with the interior of the casing. At the rear of the casing a port 11 leads to discharge duct 12 which is connected by means of valve controlled pipes 13 and 14 with an outer head 15 and a tub faucet 16.

Slidably centered in casing 5 by springs 18 and 19 is a sleeve valve 20 having a splined connection 21 with a casing to prevent it from rotation therein. Within the sleeve valve is a tube 22 fixed within the casing to cooperate therewith in defining an annular cylinder in which the sleeve valve 20 has a piston like movement. Wall surfaces of the fixture 22 and the sleeve valve 20 co-act to provide a mixing chamber 23 adapted for communication through sleeve valve ports 24 and 25 with the supply ports 9 and 10. It will be noted that ports 24 and 25 are staggered with reference to ports 9 and 10 so that the movement of the valve will open one port as the other closes, thus giving inverse control of the hot and cold water supplied to the device.

Slidable within the tube 22 is an inner sleeve valve 27 splined at 28 to the tube 22 against rotation therein and movable axially with the said tube under the control of a thermostatic spring 30. This spring is preferably made in accordance with the disclosure of the above identified patents to comprise a bimetallic strip closely wound in a minor helix, the minor helix being then wound bodily to make a major helix connected at one end with the inner sleeve 27 and at the other end with an adjustable abutment 31, splined at 32 to the fixed tube 22 and adjustable under control of the threaded end portion 33 of a rod 34 extending through a gland in the closure 6 and provided externally of the casing with a handle 35. The handle has a pointer 36 working over a conventional dial or index, preferably calibrated in degrees of temperature.

The mixture of hot and cold water co-mingled in chamber 23 passes from said mixing chamber through ducts 38 and 39 as shown in Fig. 2. The ducts 38 and 39 may, even when in registry as shown in Fig. 1, offer more resistance to the flow of the water than do the discharge fittings 15 or 16. This resistance develops a pressure differential between the mixing chamber 23 and the thermostat chamber in the control of the inner splined chamber 27. Such pressure differential is employed to operate the outer slide valve 20 which regulates the temperature of the water. As long as the water temperature to which the thermostat is exposed corresponds to the temperature for which handle 35 is fixed, the inner slide valve 27 will be held by the thermostat in the central position shown in Fig. 1. If, however, the temperature of the discharge water varies from that to which the device is adjusted, the thermostat will cause movement of the inner slide valve 27 in an axial direction either to the right or the left according to the design of the thermostat and the change in temperature of the water (a thermostat made as disclosed will either expand or contract in response to an increase in temperature according to which of the bimetallic plies is outermost in the strip of which the thermostat is made). Assuming passage 7 to be the hot water passage and assuming that either through a change in water pressure or a change in water temperature there has been an increase in temperature of the mixture and assuming further that the thermostat is wound to expand in response to an increase of mixture temperature, it will be obvious that such an increase will result in a movement of the inner slide valve 27 to the left as viewed in Fig. 21. Such a movement accomplishes three things:

In the first place the initial movement causes ports 39 to move somewhat out of registry with ports 38 thus momentarily increasing the pressure differential.

In the second place the groove 40 of the inner slide valve 27 (which is supplied through duct 41 with water pressure from the mixing chamber 23) is moved into communication with duct 42 whereby the pressure of the mixing chamber 23 is applied to the end of the piston valve 20.

In the third place the duct 43 leading from the other end of the annular cylinder in which the piston valve operates is placed in communication with groove 44 of the inner sleeve valve 27 thereby relieving the pressure at the right hand end and of the piston valve and permitting a discharge of water from that end of the cylinder into the flow which leads through discharge pipe 12 to the fittings 15 or 16 as the case may be. The result of these three operations is to employ the increased pressure differential to move the piston valve 20 to the right as viewed in Fig. 1, thus increasing the registry of the cold water ports 10 and 24 and decreasing the registry of the hot water ports 9 and 25. Just as soon as the water passing from the mixing chamber through ports 38 and 39 to the thermostat is again restored to the temperature at which the pointer 36 is adjusted, the contraction of the thermostat valve will move the inner sleeve valve to the right as viewed in Fig. 1, thus reducing the pressure differential and cutting off all communication between the slide and inlet ports of the device and the ends of the cylinder in which the piston valve 20 is operable.

If the water temperature to which the thermostat is exposed becomes decreased for any cause, a converse operation occurs. The right hand end of the cylinder in which piston valve 20 operates is placed in communication through duct 45, groove 46, and duct 43 with the mixing chamber 23, while the other end of the cylinder is placed in communication through duct 42 and groove 47 with the discharge conduit. The pressure differential having been momentarily increased the movement of the piston valve 20 toward the left as viewed in Fig. 1 is assured, whereby to increase the temperature.

If a different temperature in the discharge from the device is desired, the handle 35 is manipulated whereby to change the position of the abutment nut 31. This adjustment will, in the first instance, change the position of the inner sleeve valve 27, but as soon as the new temperature is reached, the sleeve valve will move back to center, the pitch of threads 33 being chosen to approximate the extent of expansion and contraction of the thermostat 30 through the temperature range indicated by the pointer 36 so that the inner sleeve valve will always be on center when the water is being supplied in the temperature for which the handle and pointer are fixed.

The use of the motive power of the fluid controlled by the valve provides a convenient and simple source of power through which the accurate thermostatic regulation of the water temperature is achieved. The device herein disclosed is capable of minutely accurate control of temperature because of the fact that the thermostat merely regulates the application of power to the control valve as distinguished from the arrangement shown in my companion application first mentioned above, wherein the thermostat directly fixes the positions of the valve. Where the valve is directly adjusted by the expansion and contraction of the thermostat itself, its setting will always be an approximation but in the present device, because of the use of power controlled by the thermostat, the valve will accurately determine the output temperature of the mixture.

I claim:

1. A mixing device comprising the combination with a casing having an outlet and a plurality of inlet ports, of a tubular piston valve having ports coacting with the inlet ports of said casing for inversely varying the capacity thereof, a tubular partition provided with fluid admission and discharge ducts and coacting with said casing to define an annular cylinder in which the piston valve operates, means for developing a pressure differential within said casing, channels for application of said pressure differential to move said piston valve, valve means associated with said channels and controlling the application of said pressure differential for the operation of said piston valve, and a thermostat within said casing operatively connected with said valve means for the adjustment thereof.

2. A mixing device comprising the combination with a casing having an outlet and a plurality of inlet ports, of a tubular piston valve having ports coacting with the inlet ports of said casing for inversely varying the capacity thereof, a tubular partition provided with fluid admission and discharge ducts and coacting with said casing to define an annular cylinder in which the piston valve operates, means for developing a pressure differential within said casing, channels for application of said pressure differential to move said piston valve, valve means associated with said channels and controlling the application of said pressure differential for the operation of said piston valve and a thermostat within the said casing operatively connected with said valve means for the adjustment thereof, and operatively connected with said means for developing a pressure differential for effecting a temporary increase of the pressure during adjustment of said valve means.

3. A mixing device comprising the combination with a laterally ported cylindrical casing, of a piston valve reciprocable in said casing and providing a mixing chamber and ducts coacting with the ports of said casing for inversely varying the relative capacities thereof, a tubular partition within said casing cooperating with the casing in the provision of an annular cylinder in which said piston valve is incorporated, said partition having ducts communicating with the ends of said cylinder and with said mixing chamber, a sleeve valve within said partition having means controlling communication through said ducts from said mixing chamber to the respective ends of said cylinder, and a thermostat operatively connected with said sleeve valve for the operation thereof.

4. A mixing device comprising the combination with a laterally ported cylindrical casing, of a piston valve reciprocable in said casing and providing a mixing chamber and ducts coacting with the ports of said casing for inversely varying the relative capacities thereof, a tubular partition within said casing cooperating with the casing in the provision of an annular cylinder in which said piston valve is incorporated, said partition having ducts communicating with the ends of said cylinder and with said mixing chamber, a sleeve valve within said partion having means controlling communication through said ducts from said mixing chamber to the respective ends of said cylinder, and a thermostat operatively connected with said sleeve valve for the operation thereof, said sleeve valve and partition having registerable ports normally aligned to afford communication between said mixing chamber and the interior of said casing and subject to disalignment upon the thermostatic operation of said sleeve valve whereby to increase the pressure differential to which said piston valve is subject.

5. A mixing device comprising the combination with a laterally ported cylindrical casing, of a piston valve reciprocable in said casing and providing a mixing chamber and ducts coacting with the ports of said casing for inversely varying the relative capacities thereof, a tubular partition within said casing cooperating with the casing in the provision of an annular cylinder in which said piston valve is incorporated, said partition having ducts communicating with the ends of said cylinder and with said mixing chamber, a sleeve valve within said partition having means controlling communication through said ducts from said mixing chamber to the respective ends of said cylinder, and a thermostat operatively connected with said sleeve valve for the operation thereof, said sleeve valve and partition having registerable ports normally aligned to afford communication between said mixing chamber and the interior of said casing and subject to disalignment upon the thermostatic operation of said sleeve valve whereby to increase the pressure differential to which said piston valve is subject, together with means for adjusting the thermostat to control the temperature to be maintained thereby in said casing, the rate of operation of said adjusting means being so proportioned to the rate of response of said thermostat as to maintain said pressure differential substantially at a minimum whenever the temperature of the mixture in said casing corresponds to the temperature at which said adjusting means is fixed.

FRED A. PARSONS.